(12) United States Patent
Meyer et al.

(10) Patent No.: US 8,775,720 B1
(45) Date of Patent: Jul. 8, 2014

(54) HYBRID DRIVE BALANCING EXECUTION TIMES FOR NON-VOLATILE SEMICONDUCTOR MEMORY AND DISK

(75) Inventors: Alan T. Meyer, Anaheim Hills, CA (US); William B. Boyle, Lake Forest, CA (US); Mei-Man L. Syu, Fremont, CA (US); Virgil V. Wilkins, Perris, CA (US); Robert M. Fallone, Newport Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 428 days.

(21) Appl. No.: 13/156,813

(22) Filed: Jun. 9, 2011

Related U.S. Application Data

(60) Provisional application No. 61/378,842, filed on Aug. 31, 2010.

(51) Int. Cl.
*G06F 12/02* (2006.01)

(52) U.S. Cl.
USPC .................. 711/103; 711/113; 711/E12.008; 711/E12.019; 711/E12.021

(58) Field of Classification Search
None
See application file for complete search history.

(56) References Cited

U.S. PATENT DOCUMENTS

| | | | |
|---|---|---|---|
| 5,333,138 A | 7/1994 | Richards et al. |
| 5,420,998 A | 5/1995 | Horning |
| 5,457,786 A | 10/1995 | Roush |
| 5,581,785 A | 12/1996 | Nakamura et al. |
| 5,586,291 A | 12/1996 | Lasker et al. |
| 5,636,355 A | 6/1997 | Ramakrishnan et al. |
| 5,682,273 A | 10/1997 | Hetzler |
| 5,905,901 A | 5/1999 | Klein |
| 5,913,067 A | 6/1999 | Klein |
| 5,954,820 A | 9/1999 | Hetzler |
| 6,044,439 A | 3/2000 | Ballard et al. |
| 6,115,200 A | 9/2000 | Allen et al. |
| 6,236,527 B1 | 5/2001 | Uchiike et al. |
| 6,275,949 B1 | 8/2001 | Watanabe |
| 6,295,577 B1 | 9/2001 | Anderson et al. |
| 6,408,357 B1 | 6/2002 | Hanmann et al. |
| 6,429,990 B2 | 8/2002 | Serrano et al. |
| 6,437,935 B1 | 8/2002 | Johnson et al. |
| 6,614,616 B1 | 9/2003 | Michel et al. |
| 6,661,591 B1 | 12/2003 | Rothberg |
| 6,662,267 B2 | 12/2003 | Stewart |
| 6,687,850 B1 | 2/2004 | Rothberg |

(Continued)

OTHER PUBLICATIONS

DongKyu Lee; Koh, K.; "PDC-NH: Popular data concentration on NAND flash and hard disk drive," 2009 10th IEEE/ACM International Conference on Grid Computing, pp. 196-200, Oct. 13-15, 2009.

(Continued)

*Primary Examiner* — Edward Dudek, Jr.
*Assistant Examiner* — Ralph A Verderamo, III

(57) ABSTRACT

A hybrid drive is disclosed comprising a head actuated over a disk, and a non-volatile semiconductor memory (NVSM). A first execution time needed to execute commands in a NVSM command queue is estimated, and a second execution time needed to execute commands in a disk command queue is estimated. An access command is inserted into a selected one of the NVSM command queue and the disk command queue in response to the first and second execution times, and one of the first and second execution times is updated in response to an estimated execution time of the access command.

14 Claims, 9 Drawing Sheets

(56) References Cited

U.S. PATENT DOCUMENTS

| | | | |
|---|---|---|---|
| 6,725,397 B1 | 4/2004 | Emberty et al. | |
| 6,732,241 B2 | 5/2004 | Riedel | |
| 6,754,021 B2 | 6/2004 | Kisaka et al. | |
| 6,798,599 B2 | 9/2004 | Dykes et al. | |
| 6,807,630 B2 | 10/2004 | Lay et al. | |
| 6,845,456 B1 | 1/2005 | Menezes et al. | |
| 6,892,313 B1 | 5/2005 | Codilian et al. | |
| 6,909,574 B2 | 6/2005 | Aikawa et al. | |
| 6,928,518 B2 | 8/2005 | Talagala | |
| 6,968,450 B1 | 11/2005 | Rothberg et al. | |
| 7,003,620 B2 | 2/2006 | Avraham et al. | |
| 7,017,037 B2 | 3/2006 | Fortin et al. | |
| 7,028,174 B1 | 4/2006 | Atai-Azimi et al. | |
| 7,076,605 B1 | 7/2006 | Son | |
| 7,082,494 B1 | 7/2006 | Thelin et al. | |
| 7,107,444 B2 | 9/2006 | Fortin et al. | |
| 7,114,029 B1 | 9/2006 | Thelin | |
| 7,120,806 B1 | 10/2006 | Codilian et al. | |
| 7,139,933 B2 | 11/2006 | Hsu et al. | |
| 7,142,385 B2 | 11/2006 | Shimotono et al. | |
| 7,206,948 B2 | 4/2007 | Brauer | |
| 7,231,198 B2 | 6/2007 | Loughran | |
| 7,254,721 B1 | 8/2007 | Tobias et al. | |
| 7,275,166 B2 | 9/2007 | Kaiju et al. | |
| 7,334,082 B2 | 2/2008 | Grover et al. | |
| 7,340,647 B2 | 3/2008 | Aasheim et al. | |
| 7,350,105 B2 | 3/2008 | Aasheim et al. | |
| 7,392,340 B1 | 6/2008 | Dang et al. | |
| 7,395,452 B2 | 7/2008 | Nicholson et al. | |
| 7,411,757 B2 | 8/2008 | Chu et al. | |
| 7,421,552 B2 | 9/2008 | Long | |
| 7,425,810 B2 | 9/2008 | Hobbet et al. | |
| 7,461,202 B2 | 12/2008 | Forrer, Jr. et al. | |
| 7,472,222 B2 | 12/2008 | Auerbach et al. | |
| 7,477,477 B2 | 1/2009 | Maruchi et al. | |
| 7,509,471 B2 | 3/2009 | Gorobets | |
| 7,516,346 B2 | 4/2009 | Pinheiro et al. | |
| 7,552,347 B2 | 6/2009 | Schutte | |
| 7,610,438 B2 | 10/2009 | Lee et al. | |
| 7,610,445 B1 | 10/2009 | Manus et al. | |
| 7,613,876 B2 | 11/2009 | Bruce et al. | |
| 7,644,231 B2 | 1/2010 | Recio et al. | |
| 7,647,513 B2 | 1/2010 | Tobias et al. | |
| 7,685,360 B1 | 3/2010 | Brunnett et al. | |
| 7,698,586 B2 | 4/2010 | Kim et al. | |
| 7,752,491 B1 | 7/2010 | Liikanen et al. | |
| 7,774,556 B2 | 8/2010 | Karamcheti et al. | |
| 7,984,259 B1 * | 7/2011 | English | 711/165 |
| 8,060,707 B2 * | 11/2011 | Fairhurst et al. | 711/154 |
| 8,245,003 B2 | 8/2012 | Suzuki et al. | |
| 8,286,018 B2 | 10/2012 | Chang et al. | |
| 2002/0083264 A1 | 6/2002 | Coulson | |
| 2003/0140198 A1 | 7/2003 | Ninose et al. | |
| 2005/0108473 A1 * | 5/2005 | Le Moal et al. | 711/113 |
| 2005/0120251 A1 | 6/2005 | Fukumori | |
| 2006/0075185 A1 | 4/2006 | Azzarito et al. | |
| 2006/0195657 A1 | 8/2006 | Tien et al. | |
| 2007/0006021 A1 | 1/2007 | Nicholson et al. | |
| 2007/0050540 A1 | 3/2007 | Klein | |
| 2007/0162693 A1 | 7/2007 | Nam | |
| 2008/0024899 A1 | 1/2008 | Chu et al. | |
| 2008/0040537 A1 | 2/2008 | Kim | |
| 2008/0059694 A1 | 3/2008 | Lee | |
| 2008/0130156 A1 | 6/2008 | Chu et al. | |
| 2008/0177938 A1 | 7/2008 | Yu | |
| 2008/0222353 A1 | 9/2008 | Nam et al. | |
| 2008/0256287 A1 | 10/2008 | Lee et al. | |
| 2008/0288714 A1 | 11/2008 | Salomon et al. | |
| 2008/0307270 A1 | 12/2008 | Li | |
| 2009/0019218 A1 | 1/2009 | Sinclair et al. | |
| 2009/0024793 A1 | 1/2009 | Fontenot et al. | |
| 2009/0031072 A1 | 1/2009 | Sartore | |
| 2009/0089501 A1 | 4/2009 | Ahn et al. | |
| 2009/0103203 A1 | 4/2009 | Yoshida | |
| 2009/0106518 A1 | 4/2009 | Dow | |
| 2009/0144501 A2 | 6/2009 | Yim et al. | |
| 2009/0150599 A1 | 6/2009 | Bennett | |
| 2009/0172249 A1 | 7/2009 | Matthews | |
| 2009/0172324 A1 | 7/2009 | Han et al. | |
| 2009/0172499 A1 * | 7/2009 | Olbrich et al. | 714/773 |
| 2009/0198940 A1 | 8/2009 | Ash et al. | |
| 2009/0249168 A1 | 10/2009 | Inoue | |
| 2009/0271562 A1 | 10/2009 | Sinclair | |
| 2009/0327603 A1 | 12/2009 | McKean et al. | |
| 2010/0067138 A1 | 3/2010 | Ooi et al. | |
| 2010/0088459 A1 | 4/2010 | Arya et al. | |
| 2010/0122030 A1 * | 5/2010 | Peters et al. | 711/114 |
| 2010/0169541 A1 | 7/2010 | Freikorn | |
| 2010/0191922 A1 | 7/2010 | Dickey et al. | |
| 2010/0195243 A1 | 8/2010 | Zhu et al. | |
| 2010/0325352 A1 | 12/2010 | Schuette et al. | |
| 2011/0010490 A1 * | 1/2011 | Kwon et al. | 711/103 |
| 2011/0106804 A1 | 5/2011 | Keeler et al. | |
| 2011/0283128 A1 | 11/2011 | Farhan et al. | |
| 2012/0317338 A1 | 12/2012 | Yi et al. | |
| 2013/0024650 A1 | 1/2013 | Ambat et al. | |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

Payer, et al., "Combo Drive: Optimizing Cost and Performance in a Heterogeneous Storage Device", http://csl.cse.psu.edu/wish2009_papers/Payer.pdf., Proceedings First Workshop on Integrating Solid-State Memory into the Storage Hierarchy, WISH 2009, Mar. 7, 2009, Washington DC, pp. 1-8.

Xiaojian Wu, A. L. Narasimha Reddy, "Managing Storage Space in a Flash and Disk Hybrid Storage System", Symposium on Modeling, Analysis & Simulation of Computer and Telecommunication Systems 2009 (MASCOTS '09), Sep. 21-23, 2009, pp. 1-4.

* cited by examiner

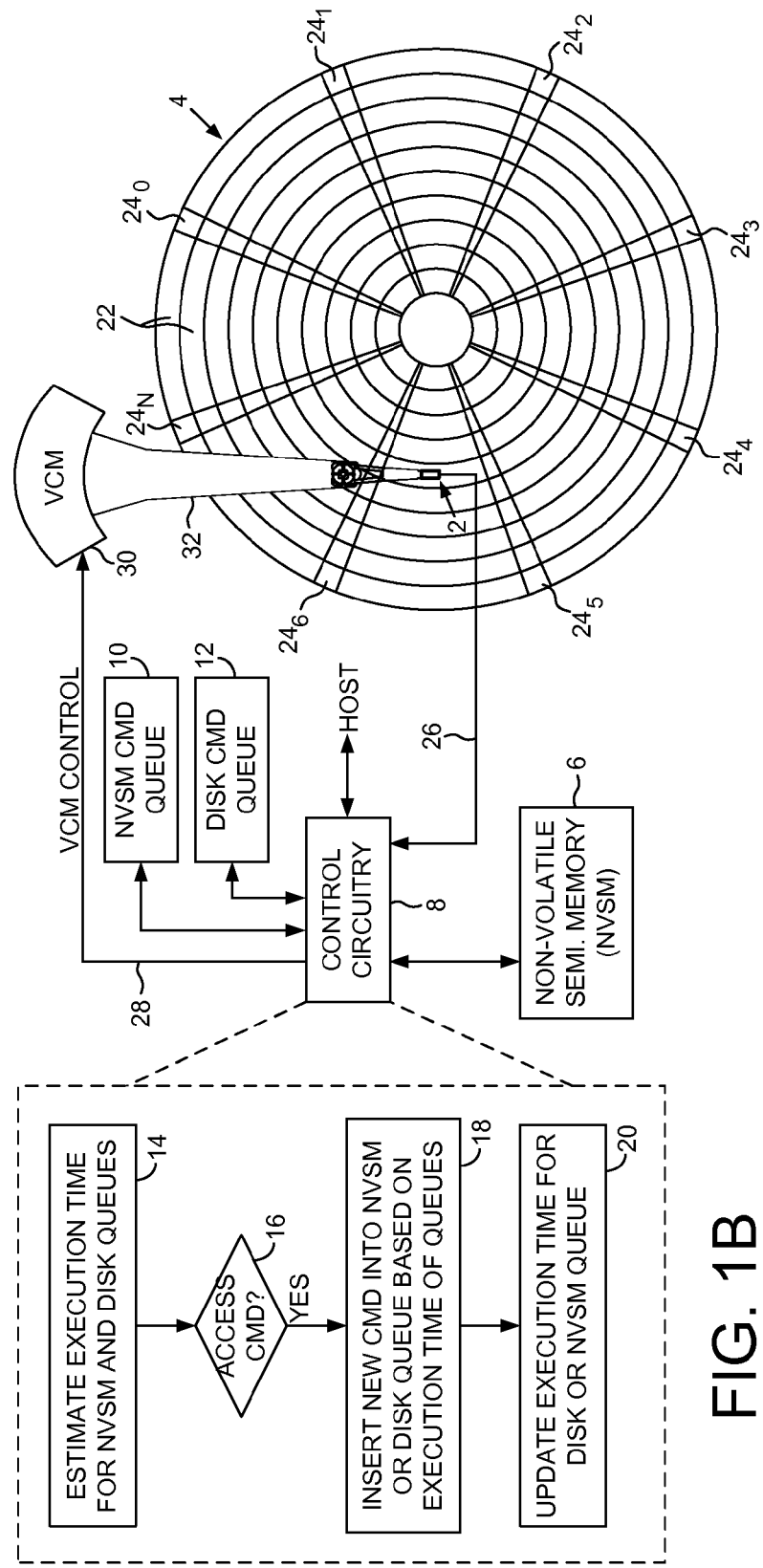

US 8,775,720 B1

HYBRID DRIVE BALANCING EXECUTION TIMES FOR NON-VOLATILE SEMICONDUCTOR MEMORY AND DISK

CROSS-REFERENCE TO RELATED APPLICATIONS

The present application claims priority from co-pending provisional U.S. Patent Application Ser. No. 61/378,842, filed on Aug. 31, 2010, the specification of which is incorporated herein by reference.

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

BRIEF DESCRIPTION OF THE DRAWINGS

FIG. 1A shows a disk drive according to an embodiment of the present invention comprising a head actuated over a disk and a non-volatile semiconductor memory (NVSM).

FIG. 1B is a flow diagram according to an embodiment of the present invention wherein an access command is inserted into one of a disk command queue or a NVMS command queue based on the execution times of the command queues.

DETAILED DESCRIPTION OF EMBODIMENTS OF THE INVENTION

Figure 2A:
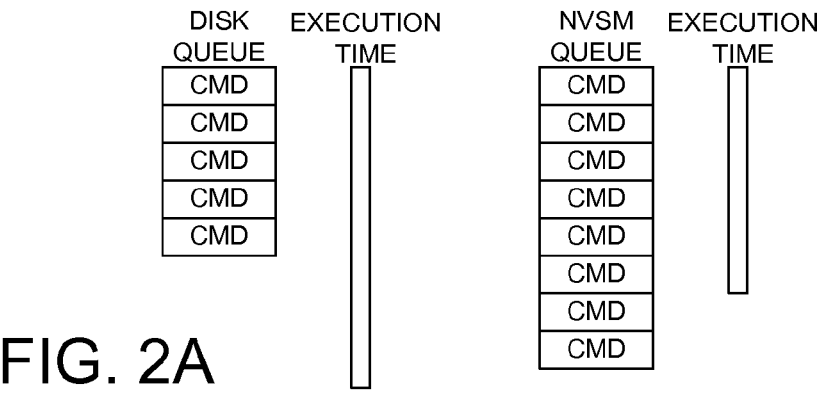
FIG. 2A shows a disk command queue and a NVSM command queue and their corresponding execution times according to an embodiment of the present invention.

FIG. 1A shows a hybrid drive according to an embodiment of the present invention comprising a head 2 actuated over a disk 4, and a non-volatile semiconductor memory (NVSM) 6. The hybrid drive further comprises control circuitry 8 operable to execute the flow diagram of FIG. 1B wherein a first execution time needed to execute commands in a NVSM command queue 10 is estimated, and a second execution time needed to execute commands in a disk command queue 12 is estimated (step 14). When an access command is received or internally generated (step 16), it is inserted into (or transferred to) a selected one of the NVSM command queue and the disk command queue in response to the first and second execution times (step 18), and one of the first and second execution times is updated in response to an estimated execution time of the access command (step 20).

In the embodiment of FIG. 1A, any suitable NVSM 6 may be employed, such as any suitable electrically erasable/programmable memory (e.g., a flash memory). In one embodiment, the NVSM 6 comprises a plurality of blocks, where each block comprises a plurality of memory segments referred to as pages. The blocks are programmed a page at a time, and an entire block is erased in a unitary operation. In embodiments described in more detail below, a garbage collection operation may be executed on previously written blocks in order to copy valid pages to new blocks (or to the disk) so that the previously written blocks may be erased and re-used.

The disk 4 shown in the embodiment of FIG. 1A comprises a plurality of data tracks 22 defined by servo sectors $24_0$-$24_N$, wherein each data track comprises a plurality of data sectors accessed indirectly through a logical block address (LBA). The control circuitry 8 processes a read signal 26 emanating from the head 2 to demodulate the servo sectors $24_0$-$24_N$ into a position error signal (PES) representing a position error of the head relative to a target data track. The control circuitry 8 comprises a servo compensator for filtering the PES to generate a control signal 28 applied to a voice coil motor (VCM) 30 that rotates an actuator arm 32 about a pivot in order to actuate the head 2 radially over the disk 4 in a direction that reduces the PES.

FIG. 2A shows a disk command queue comprising a plurality of access commands and a corresponding execution time, and a NVSM command queue comprising a plurality of access commands and a corresponding execution time. In one embodiment, the execution time for the disk command queue is based on the data rate of the disk, the amount of data in each access command, and the mechanical latency in seeking the head to a target track and waiting for the disk to rotate to a target data sector. A rotational position optimization (RPO) algorithm may be employed to sort the commands in the disk command queue in an order that minimizes the mechanical latency, and in one embodiment the RPO algorithm may also be used to estimate the execution time for all of the access commands stored in the disk command queue. When an access command is inserted into the disk command queue, the RPO algorithm may reorder the access commands and then update the estimated execution time. In one embodiment, the execution time for the NVSM command queue is based on the data rate of the semiconductor memory and the amount of data in each access command. In one embodiment, the write data rate of the NVSM may differ from the read data rate, and therefore the execution time for the NVSM command queue may also be based on the types of access commands.

In yet another embodiment, the execution time of the NVSM may be based on the frequency of access to each individual memory device within the NVSM. For example, if a number of access commands in the NVSM command queue are targeted to a single memory device within the NVSM, it will reduce the throughput of the NVSM and therefore increase the execution time of the NVSM command queue.

Figure 2B:
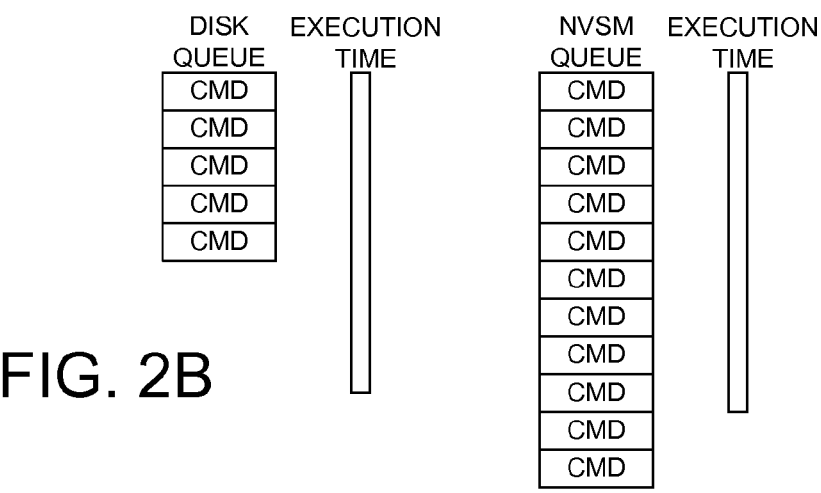
FIG. 2B illustrates an embodiment of the present invention wherein access commands are inserted into the NVSM command queue in order to balance the execution times.
Figure 2C:
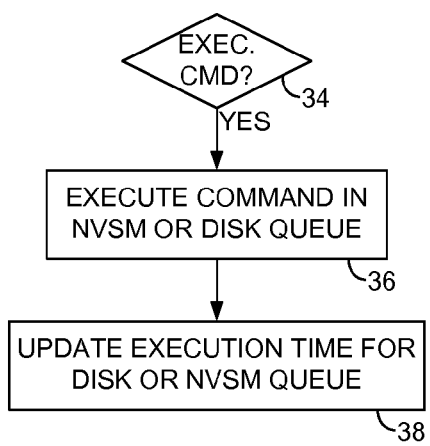
FIG. 2C is a flow diagram according to an embodiment of the present invention wherein after executing an access command, the execution time for the corresponding command queue is updated.

In the example of FIG. 2A, the execution time for the disk command queue is longer than the execution time for the NVSM command queue. Therefore in an embodiment shown in FIG. 2B, when an access command is received or internally generated it is inserted into the NVSM command queue in order to closer balance the execution times. FIG. 2C is a flow diagram according to an embodiment of the present invention wherein when an access command is selected for execution from one of the command queues (step 34), the selected access command is executed (step 36) and the execution time for the corresponding command queue is updated (step 38). In one embodiment, the execution time is updated by subtracting the estimated execution time for the access command that was executed.

Figure 3:
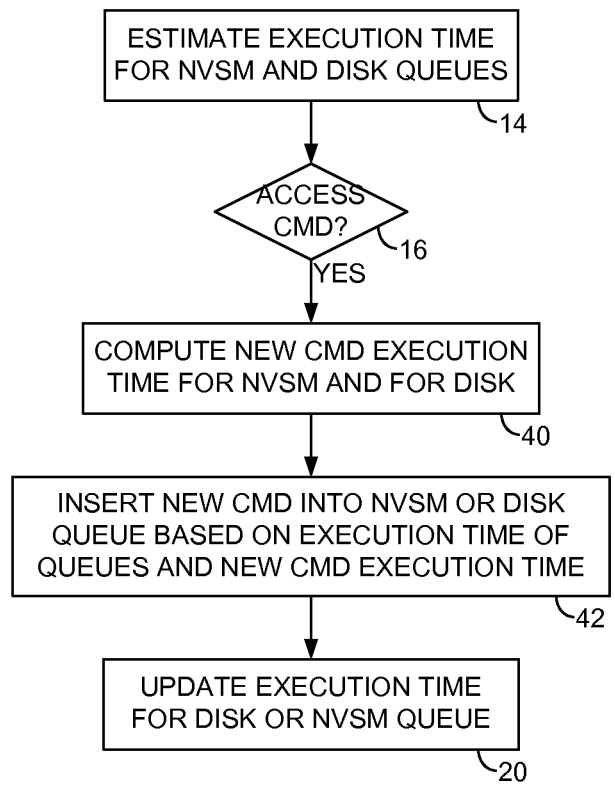
FIG. 3 is a flow diagram according to an embodiment of the present invention wherein an access command is inserted into either the disk command queue or the NVSM command queue based on the disk and NVSM execution time for the access command.

FIG. 3 is a flow diagram according to an embodiment of the present invention wherein when an access command is received or internally generated (step 16) an estimated execution time for the access command is computed for the NVSM command queue and for the disk command queue (step 40). The access command is then inserted into one of the command queues based on the execution times of the command queues and the estimated execution time for the access command (step 42). In one embodiment, an updated execution time for each command queue is estimated based on the addition of the access command to each command queue. The updated execution times are then compared in order to determine which command queue to insert the access command (e.g., insert the access command into the command queue that results in the best balance of execution times).

Figure 4A:
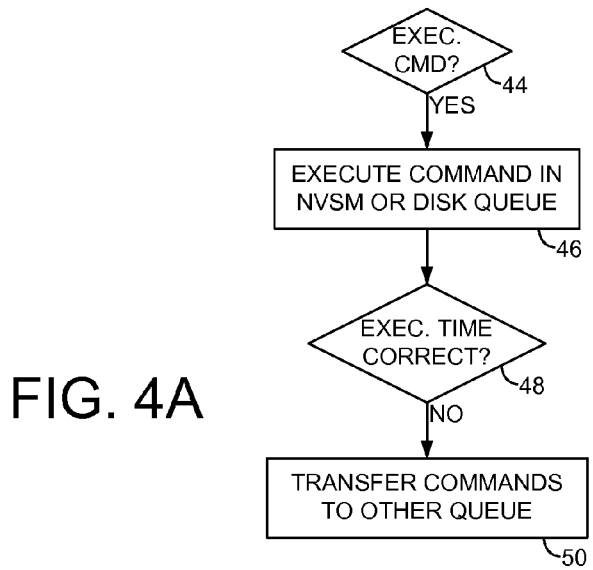
FIG. 4A is a flow diagram according to an embodiment of the present invention wherein when an error causes the actual execution time of an access command to be substantially longer than the estimated execution time, commands are transferred between the disk and NVSM command queues to balance the execution times.
Figure 4B:
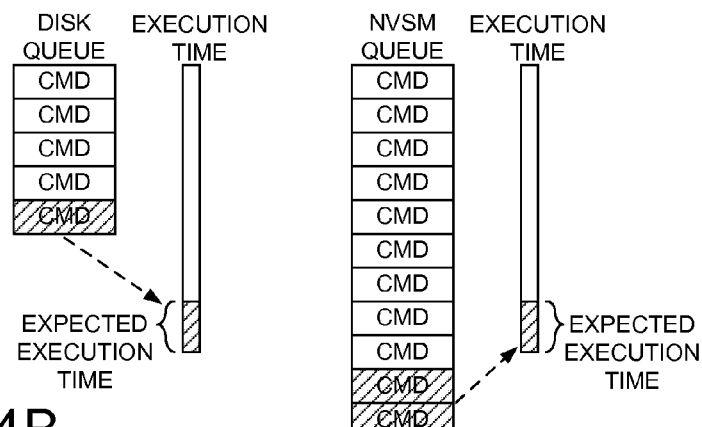
FIGS. 4B and 4C illustrate an embodiment of the present invention wherein the execution times remained balanced since the actual execution times are substantially the same as the estimated execution times.
Figure 4C:
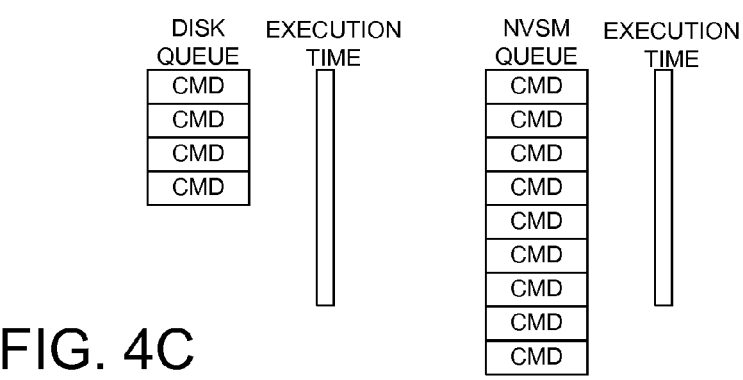
Figure 4D:
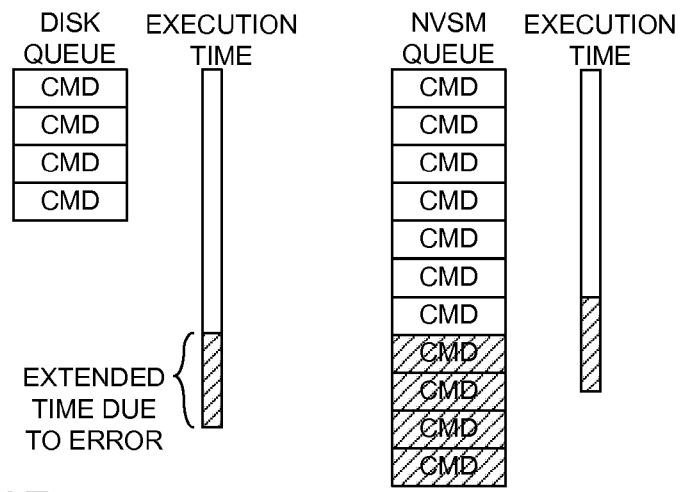
FIG. 4D illustrates an embodiment of the present invention wherein when an error causes the actual execution time to be substantially longer than the estimated execution time when executing a disk access command.
Figure 4E:
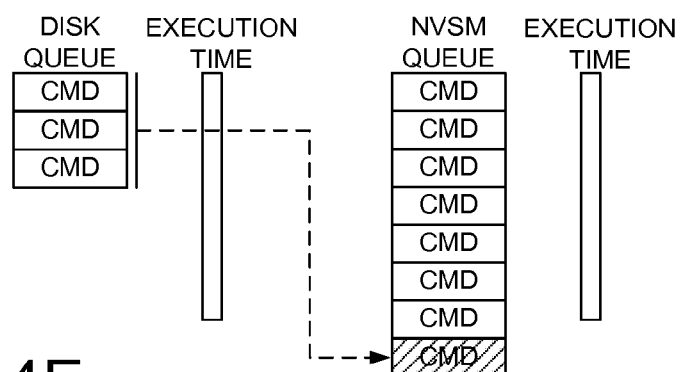
FIG. 4E illustrates an embodiment of the present invention wherein when an error occurs when accessing the disk, one or more access commands are transferred from the disk command queue to the NVSM command queue in order to balance the execution times.

FIG. 4A is a flow diagram according to an embodiment of the present invention wherein when an access command is selected for execution from one of the command queues (step 44), the selected access command is executed (step 46). If the actual execution time for the access command is substantially longer than an estimated execution time (step 48), an access command is transferred to the other command queue (step 50) in order to balance the execution times for the command queues. This embodiment is illustrated in FIG. 4B wherein an access command selected from the disk command queue has an estimated execution time that corresponds to the execution time for two commands in the NVSM command queue. If the actual execution time of the access commands substantially matches the estimated execution time (no access errors), then the execution times remain substantially balanced as illustrated in FIG. 4C. FIG. 4D illustrates an example where an error in accessing the disk causes the actual execution time for a selected access command to be substantially longer (e.g., due to retry operations). As a result, more access commands are executed from the NVSM command queue resulting in an imbalance in the execution times. Accordingly, in one embodiment one or more commands are transferred from the disk command queue to the NVSM command queue as illustrated in FIG. 4E. The access commands that are transferred may be selected using any suitable algorithm, including one of embodiments disclosed below with reference to FIGS. 6A-6C.

An error may also occur when accessing the NVSM (during write or read operations) which may significantly extend the actual execution time of an access command. For example, a write/read error to a page in a target block may require the entire block be relocated to a new block which may take a significant amount of time. Accordingly, in one embodiment when an actual execution time of an NVSM access command is substantially longer than an estimated execution time, one or more access commands are transferred from the NVSM command queue to the disk command queue in order to balance the execution times.

Figure 5A:
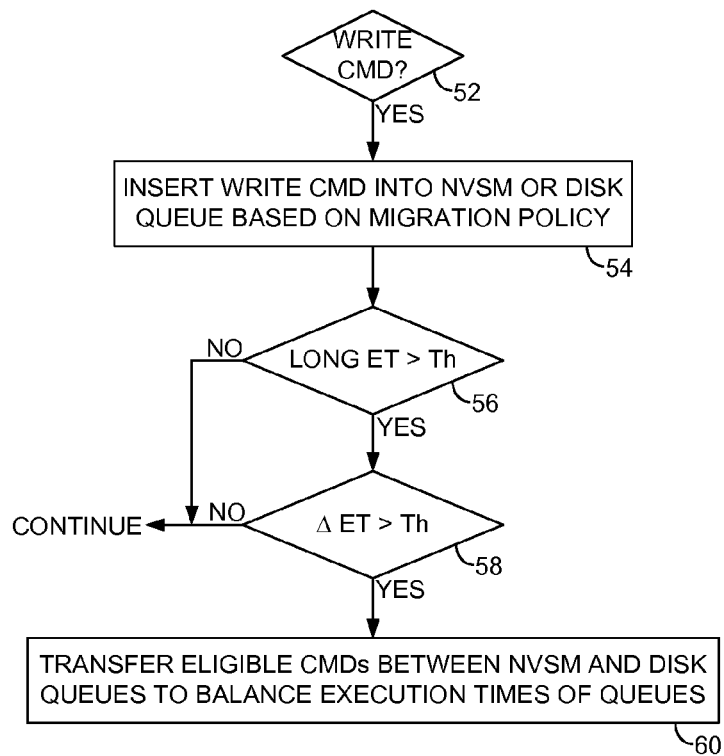
FIG. 5A is a flow diagram according to an embodiment of the present invention wherein when the access command is a write command and the longest execution time exceeds a threshold and the difference between the execution times exceeds a threshold, access commands are transferred between the command queues to balance the execution times.

FIG. 5A is a flow diagram according to an embodiment of the present invention wherein when the access command is a write command (step 52), the write command is inserted into one of the disk and NVSM command queue based on a migration policy (step 54). Any suitable migration policy may be employed, such as inserting write commands identifying sequentially accessed logical block addresses (LBAs) into the disk command queue and non-sequentially accessed LBAs into the NVSM command queue. Another migration policy may include inserting write commands identifying frequently written LBAs into the disk command queue in order to reduce write amplification of the NVSM. After inserting the write command into the respective command queue based on the migration policy, the updated execution times are evaluated to determine whether either execution time exceeds a threshold (step 56). If one of the execution times exceeds a threshold, indicating that there is a high workload of access commands, the difference between the execution times is evaluated. If the difference between the execution times exceeds a threshold (step 58), indicating the execution times require rebalancing, one or more eligible access commands are transferred between the disk and NVSM command queues, thereby overriding the migration policy in order to balance the execution times (step 60). In this embodiment, the performance benefit of balancing the execution times to better utilize the bandwidth of both channels outweighs the benefit of the migration policy. In one embodiment, a hysteresis may be employed at the threshold comparison of step 56 to prevent thrashing.

In one embodiment, one or more of the access commands may be ineligible for transfer because they identify LBAs that are pinned to one of the disk or the NVSM. For example, LBAs that identify certain operating system data may be pinned to the NVSM to ensure the performance benefit of accessing the system data from the NVSM is maintained. The access commands that are eligible for transfer may be selected using any suitable algorithm, including one of embodiments disclosed below with reference to FIGS. 6A-6C.

Figure 5B:
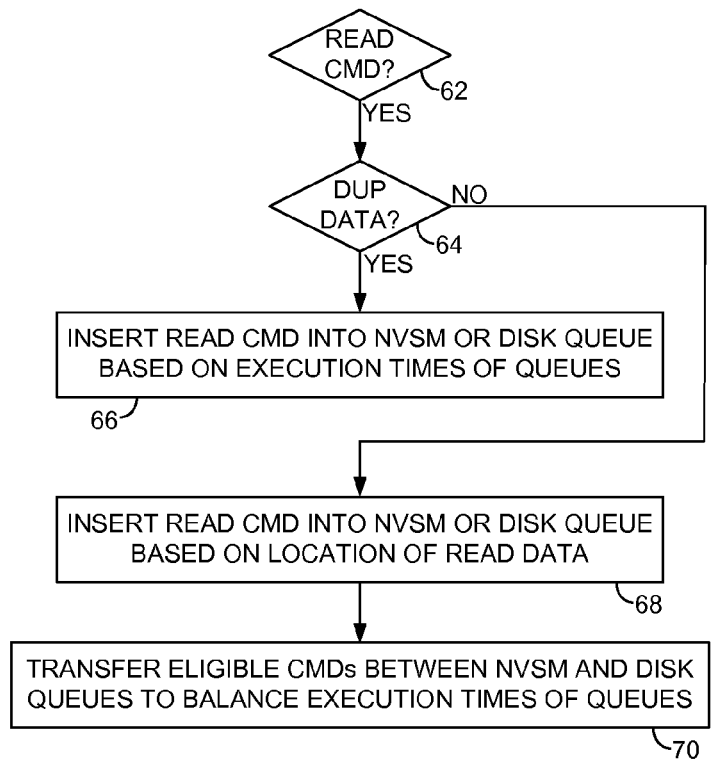
FIG. 5B is a flow diagram according to an embodiment of the present invention wherein when the access command is a read command and the data is stored on both the disk and the NVSM, then the read command is inserted into one of the command queues so as to balance the execution times.

FIG. 5B is a flow diagram according to an embodiment of the present invention wherein when the access command is a read command (step 62), the read command is evaluated to determine whether the data is stored on both the disk and the NVSM (step 64). If the data is stored on both the disk and NVSM, the read command is inserted into one of the disk and NVSM command queue based on the execution times of the command queues (step 66) to balance the execution times. If the data is stored on only one of the disk and NVSM, the read command is inserted into the respective command queue (step 68), and then one or more of the pending access commands is transferred between the command queues in order to balance the execution times (step 70).

Figure 6A:
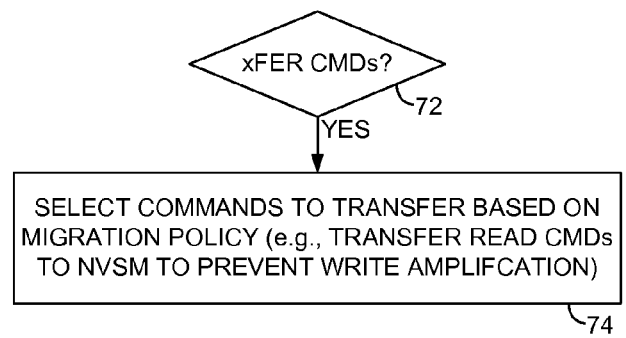
FIG. 6A is a flow diagram according to an embodiment of the present invention wherein when a decision is made to transfer access commands between the command queues, the access commands are selected based on a migration policy.

Any suitable algorithm may be employed to select access commands to transfer between the command queues in order to balance the execution times. FIG. 6A is a flow diagram according to an embodiment of the present invention wherein when a transfer of an access command is needed to balance the execution times (step 72), the access commands to transfer are selected based on a migration policy, such as transferring read commands from the disk command queue to the NVSM command queue to reduce write amplification of the NVSM (step 74). In another embodiment, write commands that are more appropriately suited for storing in the NVSM are selected for transfer to the NVSM command queue, such as write commands that are near non-sequential or write commands that identify LBAs having a lower write frequency than the LBAs of other write commands.

Figure 6B:
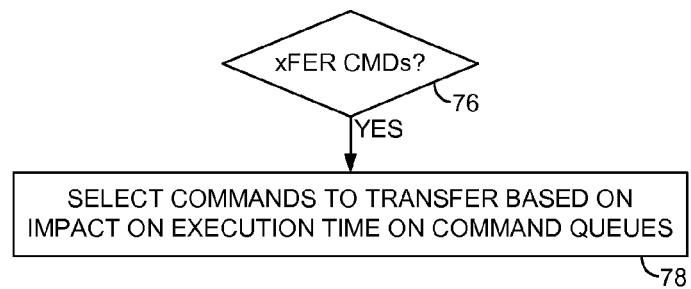
FIG. 6B is a flow diagram according to an embodiment of the present invention wherein when a decision is made to transfer access commands between the command queues, the access commands are selected based on the impact on the execution time of the command queues.

FIG. 6B is a flow diagram according to an embodiment of the present invention wherein when a transfer of an access command is needed to balance the execution times (step 76), the access commands to transfer are selected based on the resulting impact on the execution time of the command queues (step 78). For example, in one embodiment an access command may be transferred from the NVSM command queue to the disk command queue that results in the shortest execution time for the disk command queue (most optimal for the RPO algorithm). In another example, multiple short access commands may be transferred from the disk command queue to the NVSM command queue rather than one longer access command in order to maximally reduce the execution time of the disk command queue (by reducing the total number of access commands for the RPO algorithm).

Figure 6C:
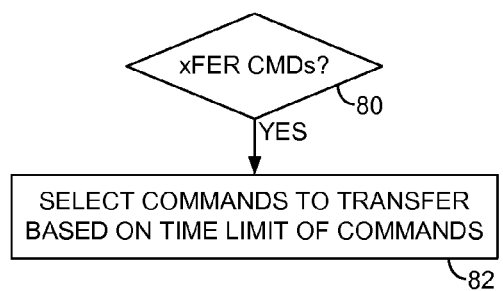
FIG. 6C is a flow diagram according to an embodiment of the present invention wherein when a decision is made to transfer access commands between the command queues, the access commands are selected based on a time limit of the access commands.

FIG. 6C is a flow diagram according to an embodiment of the present invention wherein when a transfer of an access command is needed to balance the execution times (step 80), the access commands to transfer are selected based on an execution time limit of the access commands (step 82). In this embodiment, each access command may be assigned an execution time limit within which the access command must be executed. If for example an access command in the disk command queue is reaching its execution time limit, it may be selected for transfer to the NVSM command queue in order to expedite its execution, as well as avoid disrupting the order of execution of disk access commands determined by the RPO algorithm.

Figure 7:
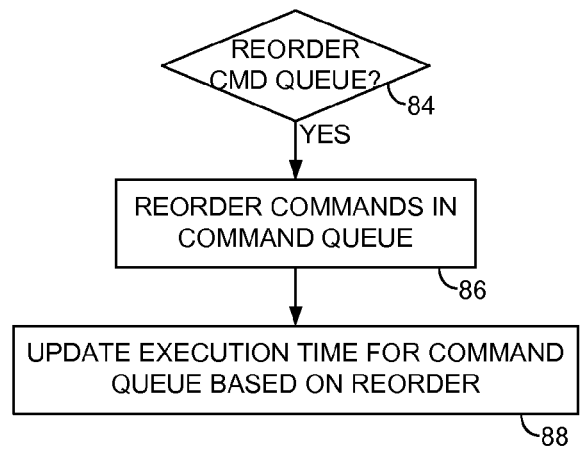
FIG. 7 is a flow diagram according to an embodiment of the present invention wherein when the access commands of a command queue are re-ordered, the corresponding execution time is updated.

FIG. 7 is a flow diagram according to an embodiment of the present invention wherein it may be necessary to re-order one of the command queues (step 84), such as when a command is inserted into the command queue, or when a pending access command is selected for out-of-order execution. After reordering the command queue (step 86), the execution time for the reordered command queue is updated (step 88) and the updated execution time evaluated to determine whether a rebalancing of execution times is needed.

Access commands may be received from a host, and in one embodiment, a large host access command may be split into two access commands in order to balance the execution times of the command queues. In one embodiment, a large host access command may be divided in half and the two resulting access commands inserted into the NVSM command queue or the disk command queue in order to balance the execution times. In another embodiment, a large host access command may be divided by a fraction that is based on the execution times of the command queues. For example, to balance the execution times two-thirds of a host access command may be inserted into the NVSM command queue and the remaining third inserted into the disk command queue (or vice versa depending on the execution times of the command queues).

Figure 8A:
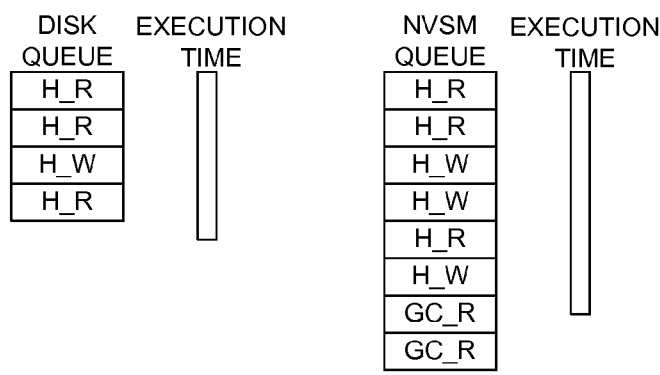
FIG. 8A illustrates an embodiment of the present invention wherein an access command may be an internal access command, such as a garbage collection read or write command.

In another embodiment, access commands may be generated internally by the hybrid drive. For example, in one embodiment the NVSM may require periodic garbage collection wherein the valid pages of previously written blocks are copied to new blocks so that the old blocks may be erased and reused. Accordingly, the garbage collection operation may generate internal read commands to read valid data corresponding to valid pages of an old block, and internal write commands to write the valid data to a new block or to the disk. FIG. 8A illustrates an example wherein the NVSM command queue comprises a number of host write and read commands (H_W and H_R), as well as two garbage collection read commands (GC_R).

Figure 8B:
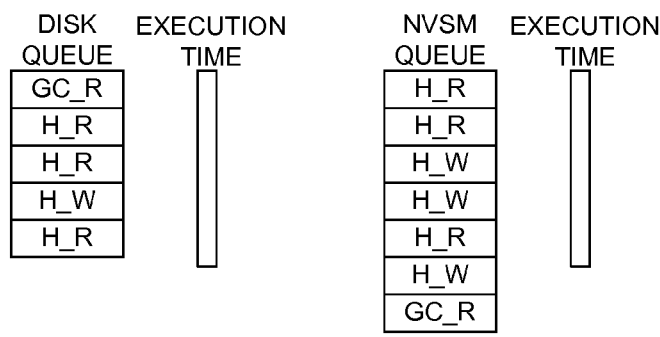
FIG. 8B illustrates an embodiment of the present invention wherein a garbage collection read command generated while garbage collecting the NVSM may be inserted into the disk command queue in order to balance the execution times.

In an embodiment illustrated in FIG. 8B, a copy of valid data in a block of the NVSM may be stored on the disk, and therefore a garbage collection read command (GC_R) stored in the NVSM command queue may be transferred to the disk command queue in order to balance the execution times of the command queues. The valid data is read from the disk and written to a new block in the NVSM so that the old block may be erased and reused while retaining a copy of the data in both the NVSM and on the disk. In another embodiment, a garbage collection read command may be inserted into the disk command queue when generated (rather than transferred from the NVSM command queue).

Figure 8C:
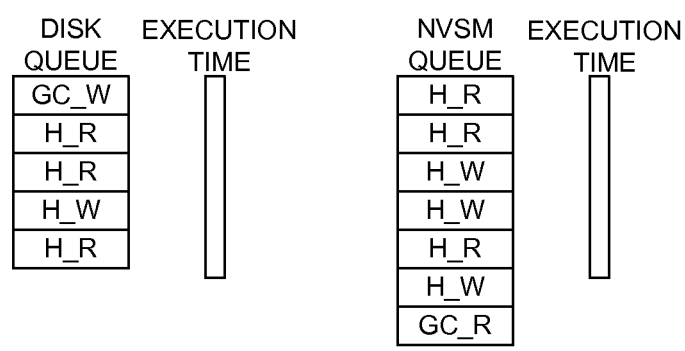
FIG. 8C illustrates an embodiment of the present invention wherein a garbage collection write command generated while garbage collecting the NVSM may be inserted into the disk command queue in order to balance the execution times.

In an embodiment illustrated in FIG. 8C, a garbage collection write command (GC_W) generated for a valid page in the NVSM may be inserted into the disk command queue rather than the NVSM command queue in order to balance the execution times of the command queues. In this embodiment, the valid data is read from a block of the NVSM, and when the garbage collection write command is executed, the valid data is effectively migrated to the disk rather then being written to a new block in the NVSM. In an alternative embodiment, a garbage collection write command may be transferred from the NVSM command queue to the disk command queue in order to balance the execution times of the command queues.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk;
   a head actuated over the disk;
   a non-volatile semiconductor memory (NVSM); and
   control circuitry operable to:
     generate a NVSM command queue operable to store access commands for the NVSM;
     generate a disk command queue operable to store access commands for the disk;
     estimate a first execution time needed to execute the commands in the NVSM command queue;
     estimate a second execution time needed to execute the commands in the disk command queue;
     insert an access command into a selected one of the NVSM command queue and the disk command queue in response to the first and second execution times;
     update one of the first and second execution times in response to an estimated execution time of the access command;
     execute a first pending access command stored in the disk command queue; and
     when an actual execution time of the first pending access command is longer than an estimated execution time of the first pending access command, transfer a second pending access command from the disk command queue to the NVSM command queue.

2. The hybrid drive as recited in claim 1, wherein the control circuitry is further operable to select the second pending access command to transfer in response to an execution time limit assigned to each access command stored in the disk command queue.

3. The hybrid drive as recited in claim 1, wherein when the access command is a write command, the control circuitry is further operable to:
   insert the access command into one of the NVSM command queue and the disk command queue in response to a migration policy; and
   when one of the first and second execution times exceeds a threshold, transfer a pending access command between the disk command queue and the NVSM command queue.

4. A method of operating a hybrid drive, the hybrid drive comprising a disk, a head actuated over the disk, a non-volatile semiconductor memory (NVSM), the method comprising:
   estimating a first execution time needed to execute commands in a NVSM command queue;
   estimating a second execution time needed to execute commands in a disk command queue;
   inserting an access command into a selected one of the NVSM command queue and the disk command queue in response to the first and second execution times;
   updating one of the first and second execution times in response to an estimated execution time of the access command;
   executing a first pending access command stored in the disk command queue; and
   when an actual execution time of the first pending access command is longer than an estimated execution time of the first pending access command, transferring a second pending access command from the disk command queue to the NVSM command queue.

5. The method as recited in claim 4, further comprising selecting the second pending access command to transfer in response to an execution time limit assigned to each access command stored in the disk command queue.

6. The method as recited in claim 4, wherein when the access command is a write command, the method further comprising:
   inserting the access command into one of the NVSM command queue and the disk command queue in response to a migration policy; and
   when one of the first and second execution times exceeds a threshold, transferring a pending access command between the disk command queue and the NVSM command queue.

7. A hybrid drive comprising:
   a disk;
   a head actuated over the disk;
   a non-volatile semiconductor memory (NVSM); and
   control circuitry operable to:
     generate a NVSM command queue operable to store access commands for the NVSM;
     generate a disk command queue operable to store access commands for the disk;
     estimate a first execution time needed to execute the commands in the NVSM command queue;
     estimate a second execution time needed to execute the commands in the disk command queue;
     insert an access command into a selected one of the NVSM command queue and the disk command queue in response to the first and second execution times;
     update one of the first and second execution times in response to an estimated execution time of the access command;
     insert the access command into one of the NVSM command queue and the disk command queue in response to a migration policy; and when one of the first and second execution times exceeds a threshold, transfer a pending access command between the disk command queue and the NVSM command queue.

8. A hybrid drive comprising:
a disk;
a head actuated over the disk;
a non-volatile semiconductor memory (NVSM); and
control circuitry operable to:
generate a NVSM command queue operable to store access commands for the NVSM;
generate a disk command queue operable to store access commands for the disk;
estimate a first execution time needed to execute the commands in the NVSM command queue;
estimate a second execution time needed to execute the commands in the disk command queue;
insert an access command into a selected one of the NVSM command queue and the disk command queue in response to the first and second execution times;
update one of the first and second execution times in response to an estimated execution time of the access command;
when the access command comprises a read command and read data for the read command is stored on the NVSM and not on the disk, insert the read command into the NVSM command queue and transfer a pending access command from the NVSM command queue to the disk command queue in response to the first and second execution times; and
when the access command comprises a read command and the read data for the read command is stored on the disk and not on the NVSM, insert the read command into the disk command queue and transfer a pending access command from the disk command queue to the NVSM command queue in response to the first and second execution times.

9. The hybrid drive as recited in claim 8, wherein the control circuitry is further operable to:
transfer the pending access command from the NVSM command queue to the disk command queue in response to a migration policy; and
transfer the pending access command from the disk command queue to the NVSM command queue in response to the migration policy.

10. The hybrid drive as recited in claim 9, wherein the migration policy transfers a pending read command from the disk command queue to the NVSM command queue to reduce write amplification of the NVSM.

11. A method of operating a hybrid drive, the hybrid drive comprising a disk, a head actuated over the disk, a non-volatile semiconductor memory (NVSM), the method comprising:
estimating a first execution time needed to execute commands in a NVSM command queue;
estimating a second execution time needed to execute commands in a disk command queue;
inserting an access command into a selected one of the NVSM command queue and the disk command queue in response to the first and second execution times;
updating one of the first and second execution times in response to an estimated execution time of the access command;
inserting the access command into one of the NVSM command queue and the disk command queue in response to a migration policy; and
when one of the first and second execution times exceeds a threshold, transferring a pending access command between the disk command queue and the NVSM command queue.

12. A method of operating a hybrid drive, the hybrid drive comprising a disk, a head actuated over the disk, a non-volatile semiconductor memory (NVSM), the method comprising:
estimating a first execution time needed to execute commands in a NVSM command queue;
estimating a second execution time needed to execute commands in a disk command queue;
inserting an access command into a selected one of the NVSM command queue and the disk command queue in response to the first and second execution times;
updating one of the first and second execution times in response to an estimated execution time of the access command;
when the access command comprises a read command and read data for the read command is stored on the NVSM and not on the disk, inserting the read command into the NVSM command queue and transferring a pending access command from the NVSM command queue to the disk command queue in response to the first and second execution times; and
when the access command comprises a read command and the read data for the read command is stored on the disk and not on the NVSM, inserting the read command into the disk command queue and transferring a pending access command from the disk command queue to the NVSM command queue in response to the first and second execution times.

13. The method as recited in claim 12, further comprising:
transferring the pending access command from the NVSM command queue to the disk command queue in response to a migration policy; and
transferring the pending access command from the disk command queue to the NVSM command queue in response to the migration policy.

14. The method as recited in claim 13, wherein the migration policy transfers a pending read command from the disk command queue to the NVSM command queue to reduce write amplification of the NVSM.

* * * * *